(12) United States Patent
Alomari

(10) Patent No.: US 11,099,842 B2
(45) Date of Patent: Aug. 24, 2021

(54) SOURCE CODE SIMILARITY DETECTION USING DIGITAL FINGERPRINTS

(71) Applicant: Saudi Arabian Oil Company, Dhahran (SA)

(72) Inventor: Firas Alomari, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 9 days.

(21) Appl. No.: 16/242,414

(22) Filed: Jan. 8, 2019

(65) Prior Publication Data

US 2020/0218535 A1    Jul. 9, 2020

(51) Int. Cl.
*G06F 8/75* (2018.01)
*G06F 16/901* (2019.01)
*G06F 8/41* (2018.01)

(52) U.S. Cl.
CPC .............. *G06F 8/751* (2013.01); *G06F 8/425* (2013.01); *G06F 16/9027* (2019.01)

(58) Field of Classification Search
CPC ....... G06F 8/425; G06F 8/751; G06F 16/9027
See application file for complete search history.

(56) References Cited

U.S. PATENT DOCUMENTS

| | | | |
|---|---|---|---|
| 6,282,698 B1 | 8/2001 | Baker et al. | |
| 7,823,127 B2 | 10/2010 | Zeidman | |
| 8,209,665 B2 | 6/2012 | Rama et al. | |
| 8,312,427 B2 | 11/2012 | Hutchison et al. | |
| 8,752,035 B2 | 6/2014 | Fanning et al. | |
| 9,110,769 B2 | 8/2015 | Zhang et al. | |
| 9,218,466 B2* | 12/2015 | Rogers | G06F 8/751 |
| 9,880,834 B2 | 1/2018 | Sakamoto | |

(Continued)

FOREIGN PATENT DOCUMENTS

| | | |
|---|---|---|
| CN | 101697121 | 4/2010 |
| CN | 105426711 | 3/2016 |

(Continued)

OTHER PUBLICATIONS

António Menezes Leitão, "Detection of Redundant Code Using R2D2",published by Software Quality Journal, 12, p. 361-382, (Year: 2004).*

(Continued)

*Primary Examiner* — S. Sough
*Assistant Examiner* — Zheng Wei
(74) *Attorney, Agent, or Firm* — Leason Ellis LLP

(57) ABSTRACT

Similarity in source code is identified by searching digital fingerprints representing at least control flow of blocks of programming statements. At least some of the source code is converted into a plurality of respective tokens. Each of the tokens is associated with a plurality of blocks. Tokens are modified by normalizing at least one value in at least one of the blocks and/or by defining at least one abstraction. Thereafter, a representation of control flow is created, and a digital fingerprint representing at control flow of a token is generated. Thereafter, source code within at least one block of a given token is determined and identifiable as being a duplicate of source code stored in a repository by comparing at least one of the generated digital fingerprints and at least one previously generated digital fingerprint.

24 Claims, 13 Drawing Sheets

(56) References Cited

U.S. PATENT DOCUMENTS

| | | | |
|---|---|---|---|
| 10,805,316 B2* | 10/2020 | Aditham | ............... H04L 9/3247 |
| 2006/0122822 A1 | 6/2006 | Simon et al. | |
| 2010/0153923 A1 | 6/2010 | Kawahito | |
| 2012/0265744 A1 | 10/2012 | Berkowitz et al. | |
| 2013/0283247 A1 | 10/2013 | Krajec et al. | |
| 2014/0337820 A1 | 11/2014 | Km et al. | |
| 2016/0124966 A1 | 5/2016 | Cohen | |
| 2016/0283229 A1* | 9/2016 | Rogers | .................... G06F 8/751 |
| 2017/0185783 A1 | 6/2017 | Brucker et al. | |
| 2017/0242671 A1* | 8/2017 | Edler Von Koch | ... G06F 8/4435 |
| 2019/0188006 A1* | 6/2019 | Ritter | ...................... G06F 9/541 |

FOREIGN PATENT DOCUMENTS

| | | |
|---|---|---|
| JP | 2008046695 | 2/2008 |
| JP | 2012164211 | 8/2012 |
| JP | 2013164765 | 8/2013 |
| JP | 5875961 | 3/2016 |
| KR | 20140035608 | 3/2014 |

OTHER PUBLICATIONS

Chilowicz et al., "Finding similarities in source code through factorization", published in Electronic Notes in Theoretical Computer Science, pp. 1-15 (Year: 2008).*

Chilowicz et al., "Syntax tree fingerprinting: a foundation for source code similarity detection", retrieved online from [https://hal-upec-upem.archives-ouvertes.fr/hal-00627811], submitted on Sep. 29, 2011, pp. 1-18 (Year: 2011).*

Roy et al., "Comparison and evaluation of code clone detection techniques and tools: A qualitative approach", published by Science of Computer Programming 74 (2009), pp. 470-495 (Year: 2009).*

Patenaude et al., "Extending software quality assessment techniques to java systems", Proceedings of the 7th International Workshop on Program Comprehension, IWPC 1999, 1999, pp. 49-56 (Year: 1999).*

Mayrand et al., "Experiment on the automatic detection of function clones in a software system using metrics", Proceedings of the 12th International Conference on Software Maintenance, ICSM 1996, 1996, pp. 244-253 (Year: 1996).*

Kontogiannis et al., "Pattern matching for clone and concept detection", Journal of Automated Software Engineering 3 (1-2) (1996) 77-108. (Year: 1996).*

Rattan et al., "Software clone detection: A systematic review", Elsevier, vol. 55, Issue 7, Jul. 2013, pp. 1165-1199.

Wang et al., "f) Hashing for similarity search: A survey", arXiv, Aug. 14, 2014, pp. 1-29.

Roussev, Vassil, "Data Fingerprinting with Similarity Digests", Springer, 6$^{th}$ IFIP WG 11.9 International Conference on Digital Forensics (DF), Jan. 2010, IFIP Advances in Information and Communication Technology, AICT-337, pp. 207-226, Advances in Digital Forensics VI.

International Search Report and Written Opinion in Corresponding PCT Application. No. PCT/US2020/012197 dated Apr. 16, 2020. 15 pages.

Written Opinion of the International Preliminary Examining Authority in Corresponding PCT Application No. PCT/US2020/012197 dated Sep. 8, 2020. 6 pages.

International Preliminary Report on Patentability in Corresponding PCT Application No. PCT/US2020/012197 dated Dec. 7, 2020. 20 pages.

* cited by examiner

| | | | 306 | |
|---|---|---|---|---|
| LEVEL | 0 | I(4) | 00000000 | TYPE=STMNT L... |
| STRUC | 0 | I(4) | 00000000 | TYPE=STMNT S... |
| FROM | 0 | I(4) | 00000000 | TYPE=STMNT F... |
| TO | 0 | I(4) | 00000000 | TYPE=STMNT TO |
| NUMBER | 0 | I(4) | 00000000 | TYPE=STMNT NR |
| COLONROW | 0 | I(4) | 00000000 | TYPE=STMNT C... |
| TROW | 0 | I(4) | 00000000 | TYPE=STMNT T... |
| COLONCOL | 0 | INT2(2) | 0000 | TYPE=STMNT C... |
| TCOL | 0 | INT2(2) | 0000 | TYPE=STMNT T... |
| PREFIXLEN | 0 | INT2(2) | 0000 | TYPE=STMNT P... |
| TYPE | | C(1) | 2000 | TYPE=STMNT T... |
| TERMINATOR | | C(1) | 2000 | TYPE=STMNT T... |
| ENHMT | 0 | I(4) | 00000000 | TYPE=%_T0000... |

FIG. 3B

| | Attributes | Standard [27x9(32)] | |
|---|---|---|---|
| | Insert Column | | |
| Row | STR [CString] | ROW [I(4)] | OFF |
| 1 | REPORT | 6 | 0 |
| 2 | Z_SIMPLE-PRG | 6 | 0 |
| 3 | DATA | 8 | 0 |
| 4 | A | 8 | 0 |
| 5 | VALUE | 8 | 0 |
| 6 | 2 | 8 | 0 |
| 7 | IF | 9 | 0 |
| 8 | A | 9 | 0 |
| 9 | > | 9 | 0 |
| 10 | 0 | 9 | 0 |
| 11 | A | 10 | 0 |
| 12 | = | 10 | 0 |
| 13 | A | 10 | 0 |
| 14 | - | 10 | 0 |
| 15 | 1 | 10 | 0 |
| 16 | ELSEIF | 11 | 0 |
| 17 | A | 11 | 0 |
| 18 | < | 11 | 0 |
| 19 | 0 | 11 | 0 |
| 20 | A | 12 | 0 |
| 21 | = | 12 | 0 |
| 22 | A | 12 | 0 |
| 23 | + | 12 | 0 |
| 24 | 1 | 12 | 0 |
| 25 | ENDIF | 13 | 0 |

SOURCE CODE SIMILARITY DETECTION USING DIGITAL FINGERPRINTS

FIELD OF THE DISCLOSURE

The present disclosure is related, generally, to management of program source code and, more particularly, to locating and identifying duplicate or similar program source code across an enterprise.

BACKGROUND OF THE DISCLOSURE

During computer program development, computer programmers often copy and paste at least portions of existing programming code ("source code fragments"). Thereafter, minor changes are often made to the pasted source code fragments. Unfortunately, such practice often introduces defects in existing source code, including when developers overlook making updates to source code fragments that have been copied and pasted many times. Moreover, copied source code often does not comply with copyright and/or licensing restrictions, which creates compliance issues. Maintenance of source code, such as with extensions and patches, often need to be applied to each respective copied source code fragment which can be difficult or impossible to locate, particularly after years of copying and pasting.

Over time, source code tools have been developed that identify exact and/or similar code fragments. These tools often work by scanning source code or a representation thereof to identify pieces of code (e.g., source code fragments) that are the same or similar. Often these tools are limited to "brute-force" methods that are unable to handle a program codebase that is large or complex. Traditional source code tools are often unable to present results of detection and analyses in a usable and useful manner to a software developer. Furthermore, conventional tools are unable to locate source code fragments that are textually different, such as due to variable renaming, statement insertions, deletions, and replacements, but that still share enough similarity to be considered duplicative. This makes precise searching techniques infeasible and, as a result, traditional source code tools tend to over-compensate and over-approximate. Over-approximating results in a considerable number of false positives, which often requires manual inspection.

Accordingly, there exists an unfulfilled need for a technology solution that can locate and identify source code duplicates, including in a large code base which may have many code artifacts, and that are similar but not necessarily identical. The present invention addresses these and other needs in the art.

SUMMARY OF THE DISCLOSURE

In one or more implementations, the present application provides systems and methods for identifying similarity in source code in accordance with searching digital fingerprints representing at least blocks of programming statements. At least one processor that is configured by executing program instructions stored on non-transitory processor-readable media accesses programming source code. At least some of the source code is converted into a plurality of respective tokens, wherein each of the tokens is associated with a plurality of blocks of programming statements. Moreover, the tokens are modified by normalizing at least one value in at least one of the plurality of blocks of programming statements, and/or by defining at least one abstraction associated with at least one operation associated with at least one of the blocks of programming statements. Thereafter, a representation is created which is associated with control flow of a plurality of blocks associated with a respective token. The control flow includes a plurality of possible operational paths associated with the blocks in each of the modified tokens. Moreover, a digital fingerprint representing a respective operational path associated with the control flow for a given token is generated. Thereafter, source code within at least one block of a given token is determined and identifiable as being a duplicate of source code stored in a repository by comparing at least one of the generated digital fingerprints and at least one previously generated digital fingerprint.

According to a further aspect of the disclosure, an abstract syntax tree is generated by at least one processor from the tokens, wherein the abstract syntax tree comprises a plurality of nodes corresponding to the source code.

According to a further aspect of the disclosure, the abstract syntax tree is derived by: defining a root element; assigning statements to each of at least one child node of the root element; and assigning a value and/or a variable to each of the at least one child node.

According to a further aspect of the disclosure, the generated representation associated with the control flow is a control flow graph.

According to a further aspect of the disclosure, the control flow graph is generated using an abstract syntax tree which is generated from the tokens.

According to a further aspect of the disclosure, the generated digital fingerprint further represents control flow associated with a plurality of the blocks.

According to a further aspect of the disclosure, a digital fingerprint is generated which represents a source code program associated with at least one of the tokens.

According to a further aspect of the disclosure, at least one processor identifies, as a function of searching and detecting a match between the generated digital fingerprint representing the source code program and at least one previously generated digital fingerprint representing a different source code program, a duplicate of at least part of a source code program associated with at least one of the respective tokens and the different source code program.

According to a further aspect of the disclosure, at least one processor determines that the at least one of the generated digital fingerprint representing a source code program and at least one previously generated digital fingerprint representing a different source code program meet a predetermined threshold of similarity. Further, at least one processor identifies the at least one statement that is a duplicate. Further, at least one processor identifies at least one source code program that contains the at least one statement that is a duplicate.

According to a further aspect of the disclosure, the digital fingerprint is generated as a function of hashing.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

FIG. 3B shows example output that is generated by a tokenizer, in accordance with an example implementation of the present application.

FIG. 4B illustrates example output representing an abstract syntax tree, in accordance with the present application.

Figure 1:
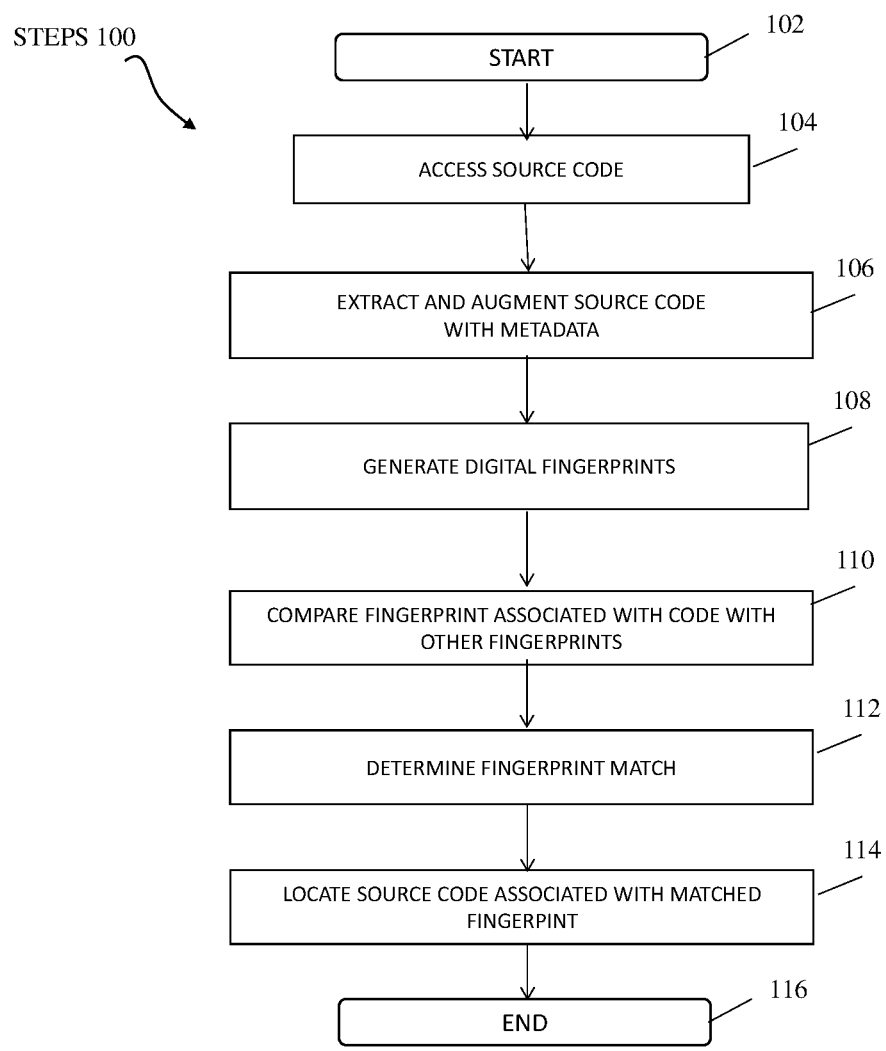
FIG. 1 is a flow diagram showing a routine that illustrates a broad aspect of the present application, in accordance with one or more embodiments.

The present disclosure is further described in the detailed description that follows.

DETAILED DESCRIPTION OF CERTAIN EMBODIMENTS

By way of overview and introduction, the present application presents technical method(s) and system(s) for efficient and scalable identification of duplicate source code by using digital fingerprints that represent aspects of the source code. As used herein, program source code that is termed "duplicate" or "duplicative" refers, generally, to at least a portion of program source code that is identical or similar to other program source code within prescribed criteria, including within prescribed tolerances.

The digital fingerprints, which are used as a basis for searching for duplicative source code, can be generated within a processor using code executing therein to process a digital representation of source code, including the execution behavior of the source code, and by hashing processes to enable improved matching of similar source code. For example, implementations of the present application use control dependency graphs to capture interrelations between different components of source code, and control flow graphs are used to represent the execution behavior of the source code. As described in greater detail herein, techniques can be implemented to determine whether two source code fragments are similar, rather than identical. For example, so-called "fuzzy" hashing techniques can be used to reduce large files into relatively small number of data values, which are then hashed and used for searching. This improves searching processes for duplicative source code, particularly against large source code bases such as those in enterprise resource planning ("ERP") systems.

In one or more implementations of the presentation application, source code is processed and represented by generic control flow programming blocks. The blocks are transformed, for example, by using one or more hashing functions to generate unique digital fingerprints. The digital fingerprints represent code semantics as well as code execution behavior. The fingerprints can be stored and later used for searching for duplicate source code.

The technical features presented herein include analysis of the digital representation of a source code control flow graph in which specific blocks in the control flow graph are transformed into digital fingerprints. Here, a control flow graph is used colloquially with the understanding that that the machine processing and analyzing the source code in question is actually operating on digital representations of the control flow graph, rather than on an actual "graph." The digital fingerprints can be derived from representations of generic code constructs in the source code, as well as the way such constructs are used. Practical complexities associated with scalability and flexibility are addressed by incrementally storing and reusing digital fingerprints for searching and locating duplicate source code.

Use of control-flow graphs in the present application is advantageous to identify all possible paths that can be traversed by a program during execution, which can be represented using graph notations. Minor and relatively insignificant differences between different source code fragments need not be represented in different respective graphs, which improves the likelihood of identifying duplicative source code that may not be strictly identical. Moreover, the present application supports grouping and clustering which can also speed up searching in ERP systems. This approach improves upon known techniques that rely on searching source code fragments (i.e., hash blocks table) by comparing code against every piece of code in a source code repository (e.g., "pairwise comparison"). Such pairwise comparison techniques in large source code repositories are overly intensive and require significant computing and storage resources.

The disclosure, including various features and advantageous thereof, are explained more fully with reference to non-limiting embodiments and examples in the following description and/or illustrated in the accompanying drawings. It should be noted that illustrated features in the drawings are not necessarily to scale, and features of one embodiment may be employed with other embodiments as those skilled in the art would recognize, even if not explicitly stated herein. Descriptions of well-known components and processing techniques may be omitted so as not to obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

Turning now to FIG. 1, a flow diagram is described showing a routine 100 that illustrates a broad aspect of a method for converting and searching for duplicate source code in accordance with one or more embodiments of the present application. It is to be appreciated that several of the logical operations described herein are implemented as a sequence of computer-implemented acts or program modules running on one or more computing devices. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 1, the process begins at step 102. At step 104, program source code is accessed, which is a basis for a search for duplicate source code. For example, the source code is accessed by a computing system configured by executing instructions that are stored on non-transitory processor-readable media. The program source code can be accessed from a source code repository that stores existing source code. Alternatively, the program source code can be accessed substantially in real time, including as it is being developed. At step 106, the accessed source code is transformed, at least in part by extracting discrete portions of the source code (e.g., source code fragments) and augmenting the source code fragments with metadata. Details regarding transforming source code pursuant to step 106 in accordance with one or more implementations of the present application are provided below.

Continuing with reference to FIG. 1, at step 108 digital fingerprints are generated. At step S110, a digital fingerprint that was generated at step 108 is compared with stored digital fingerprints that were previously generated from other transformed source code fragments. At step 112, the digital fingerprint generated from the transformed source code is "matched" with one or more other stored digital fingerprints, by means of the processor being configured by code to determine instances in which source code within at least one block of a given token which is identifiable as being a duplicate of source code stored in a repository. Such a determination can be made by identifying matches within one or more prescribed tolerances, such above 0.993. For example, a similarity metric such as $Sim(P, P')=B_{id}/(B_{id}+B_{df}+1/\alpha\ B_{ma})$ can be defined, where $B_{id}$ represents one or more identical source code blocks in both program fingerprints and in the same location. Moreover, $B_{df}$ represents one or more blocks which are not equal and stored in different locations. Still further, $B_{ma}$ represents one or more blocks that are equal but misaligned, and a is a sensitivity factor. Other statistics for comparing the similarity and/or diversity of digital fingerprints generated in accordance with the teachings herein are available and described below.

Thus, at step 114, the program source code associated with the matched stored fingerprint is located and obtained, and the source code is identified is being a "duplicate." Thereafter, at step 116 the process ends. In one or more implementations of the present application, steps are provided for identifying similarity in source code in accordance with searching digital fingerprints representing at least blocks of programming statements, in lieu of a comparison of the source code itself.

In one or more implementations and as described in greater detail below, fingerprints generated in accordance with the teachings herein can be grouped or clustered based at least on the same or similar X number of blocks. The groups are used during searching for duplicative source code by identifying a first X number of blocks of a particular fingerprint to search for one or more other fingerprints within one or more respective groups in accordance with the initial X number bocks. Thereafter, additional searching for duplicative source code, such as by pairwise comparisons, can occur for just the source code associated with the fingerprint(s) within the respective group(s). This technique improves the efficacy and efficiency of a search of source code, such as within a large codebase, by reducing detailed searching (e.g., pairwise comparisons) to one or more subsets of the codebase.

Figure 2:
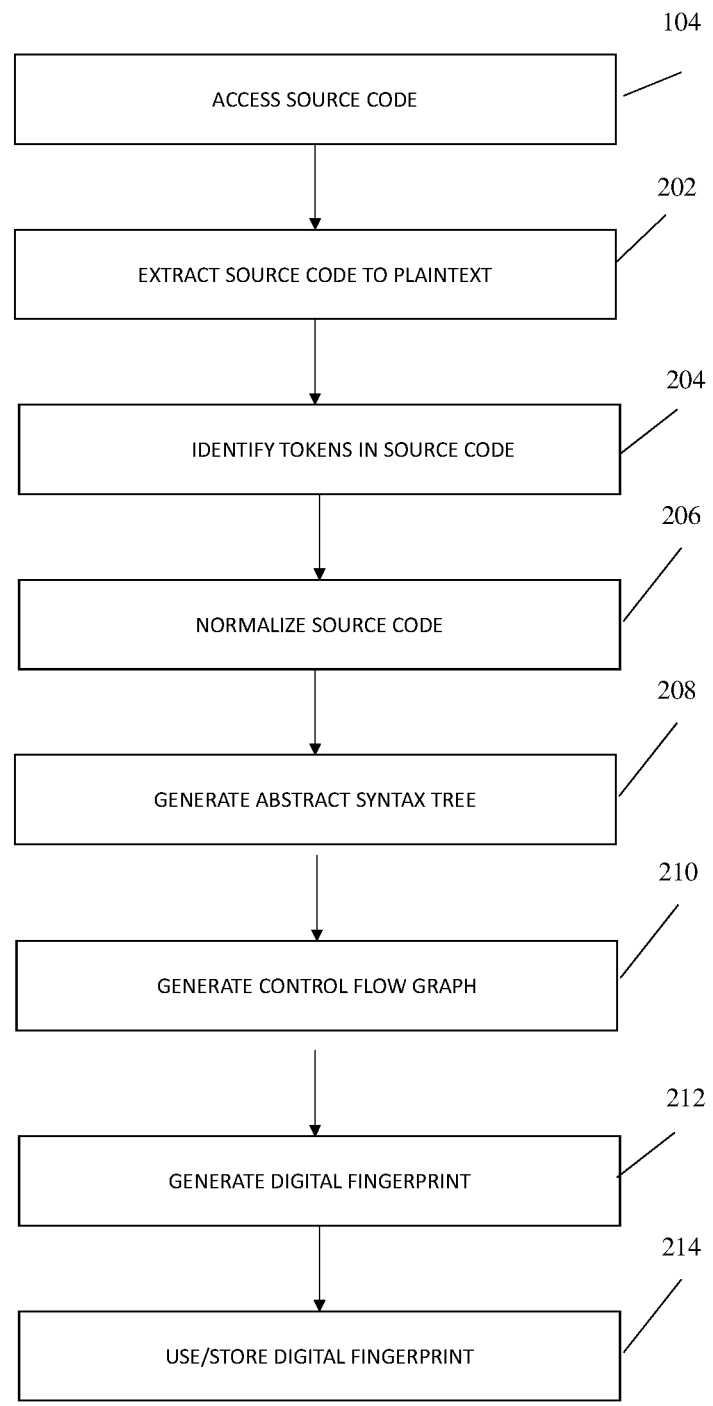
FIG. 2 is a flow diagram illustrating details associated with certain steps illustrated in FIG. 1, in accordance with one or more embodiments of the present application.

FIG. 2 is a flow diagram illustrating additional details associated with certain steps illustrated in FIG. 1, in accordance with one or more embodiments of the present application. In particular, FIG. 2 illustrates steps associated with transforming and augmenting program source code (step 106) and with generating digital fingerprints from the transformed/augmented program source code (step 108).

After program source code is accessed (step 104), the source code is extracted, such as by being converted from a compressed format to plaintext (step 202). Thereafter, tokens are identified in the program source code (step 204). For example, a tokenizer, as known by one of ordinary skill in the art, is employed to parse the program source code into tokens. Tokens can be identified in the program source code by finding whitespace (e.g., tabs, spaces, new lines) or other recognizable aspects in the program source code. Thereafter, at step 206 a suitable lexical extractor (a "lexer") as known by one of ordinary skill in the art is employed to normalize the tokens identified in the program source code, including by adding extra context to the tokens. For example, metadata can be appended to tokens that identify tokens as numbers, string literals, equality operators, or the like.

Moreover, user-defined identifiers in the tokens can be replaced with specific fixed tokens, for example, to ensure that changes in variable names and other modifiers can be detected during searches for duplicate source code. More particularly, normalized values, such as a respective identifier name and a corresponding literal value, can be fixed with a specific token. For example, a local variable named "variableName" can be replaced by "l_variableName." Further, abstractions of syntactic structure, such as IF statements, CASE statements and LOOPs, can be normalized to ensure that minor changes made to copies of such code, including changes which do not impact the functionality the code during operation, are accounted for. Table 1, below, illustrates example normalization structures.

TABLE 1

| Patterns | Proposed Normalization |
| --- | --- |
| Local Variables | L_VARIABLES |
| Global Variables | G_VARIABLES |
| loops: For, Do, and while | iteration<br><start><br><condition><br><+/-> |
| Conditions: If, if else, case | Selection <condition> |

Continuing with reference to FIG. 2, after normalization an abstract syntax tree, as known in the art, is generated from the normalized tokens (step 208). Each node in the abstract syntax tree can correspond to an abstract component in the program source code that was normalized in step 206, (e.g., a function declaration, an operator, or other component). In one or more implementations of the present application, a tree node in the abstract syntax tree is a tuple. The first component in the tree represents the type or name of the node followed by zero or more components, each representing a child of a current node. More particularly, the abstract syntax tree is derived by defining the root element, assigning statements as child node(s), and adding variables and values to the child node(s).

Continuing with reference to the example implementation in the flowchart of FIG. 2, after the abstract syntax tree is created, it is used to generate a control flow graph (step 210). In particular, the control flow is derived by a) identifying basic blocks which include no branches or conditions, and by b) identifying every node except the first node, which has only one path in and one path out.

Also as used herein, a control flow represents an order in which statements in source code execute. In view of conditional logic, branching, looping, or the like, control flow can represent different possible paths that a certain software program will take during execution. Typically, a set of statements are structured as a block, in which all statements in the block are executed in the same scope of control. The present application improves upon searching for duplicative source code, including by using specific representations of source code execution behavior, and by hashing techniques and refined searching of subsets of source code within a codebase.

In one or more implementations a control flow graph is generated using the abstract syntax tree by exploring different execution paths in the code. In one or more implementations, intermediate code of each node is divided into basic blocks (Bn). More particularly, an example basic block is a fragment of straight line code, in which no jumps (i.e., loops or conditional statements) occur in or out of the middle of the respective block. During generation of a control flow graph, blocks are identified as a function of one or more determinations, including by determining a set of block leaders (L) (i.e., first line of basic block B). In one or more implementations, the first line in a block is always determined to be a leader. Moreover, any line is a leader if the block contains a tuple IF . . . goto Bn, goto Bn, i.e., are loops. Furthermore, a line that immediately follows IF . . . GOTO Bn or if GOTO Bn is a leader. Moreover, in one or more implementations, a basic block Bn includes a leader and all the following statements until the next leader.

Accordingly, in one or more implementations the basic blocks within one software program are organized as a control flow graph. The control flow graph has basic blocks B1 . . . Bn as nodes, and has a directed edge, B1->B2, for example if control can flow from B1 to B2. The following conditions are usable for organizing blocks within programming source code in accordance with one or more implementations of the present application. Directed edges are constructed from jump instructions, while conditional jumps specify two directed edges. Conditional jumps can include one jump from a current node to its direct successor node, and another jump from a current node to a respective node resulting from program control flow. Unconditional jumps can define one direct edge from a current node to its direct successor node. Furthermore, special nodes "ENTER" and "EXIT" can be treated as a source and sink of the control flow graph. These nodes represented in a control flow graph and respective hashing and grouping functionality shown and described herein improve upon searching for duplicative source code, particularly in large ERP systems.

Figure 3A:
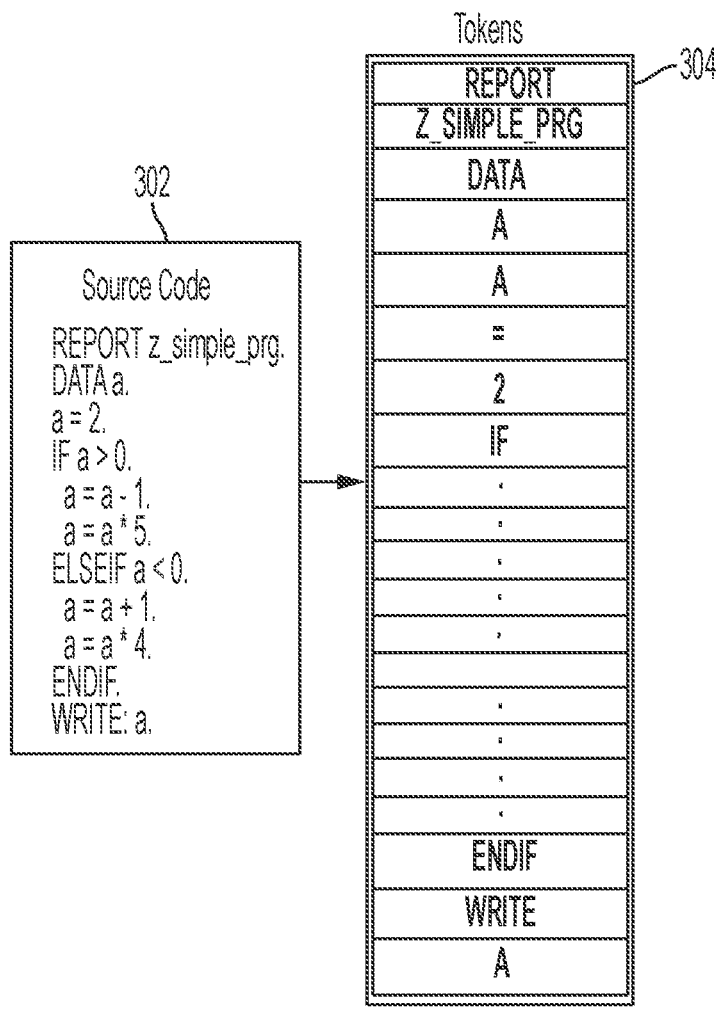
FIG. 3A illustrates an example transformation of program source code in plaintext, which includes assignments, conditional statements, and commands.
Figure 4A:
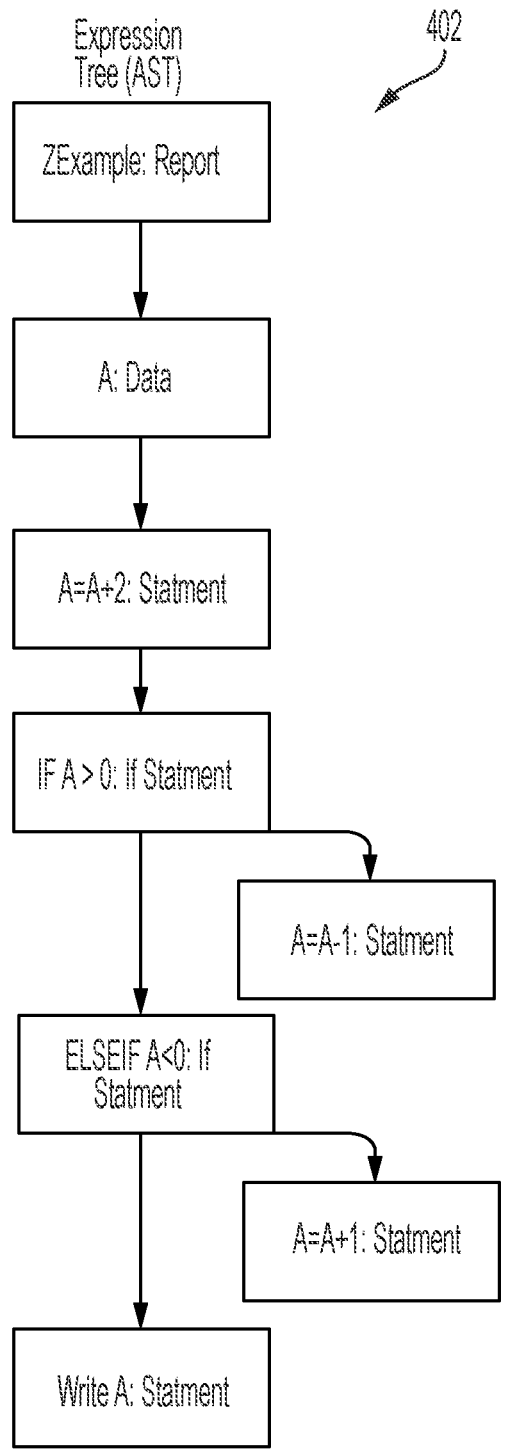
FIG. 4A illustrates an example abstract syntax tree that is generated from tokens that were normalized and augmented with metadata.

FIGS. 3A, 3B, 4A, and 4B illustrate a transformation process of program source code from plaintext to a control flow graph, in accordance with an example implementation of the present application. FIG. 3A illustrates an example transformation of program source code 302 in plaintext, which includes assignments, conditional statements, and commands. The source code 302 is expressed in respective table tokens 304. FIG. 3B shows example output 302 that is generated by a tokenizer. FIG. 4A illustrates an example abstract syntax tree 402 that is generated from the tokens that were normalized and augmented with metadata. FIG. 4B illustrates example output representing an abstract syntax tree, in accordance with the present application.

Figure 5:
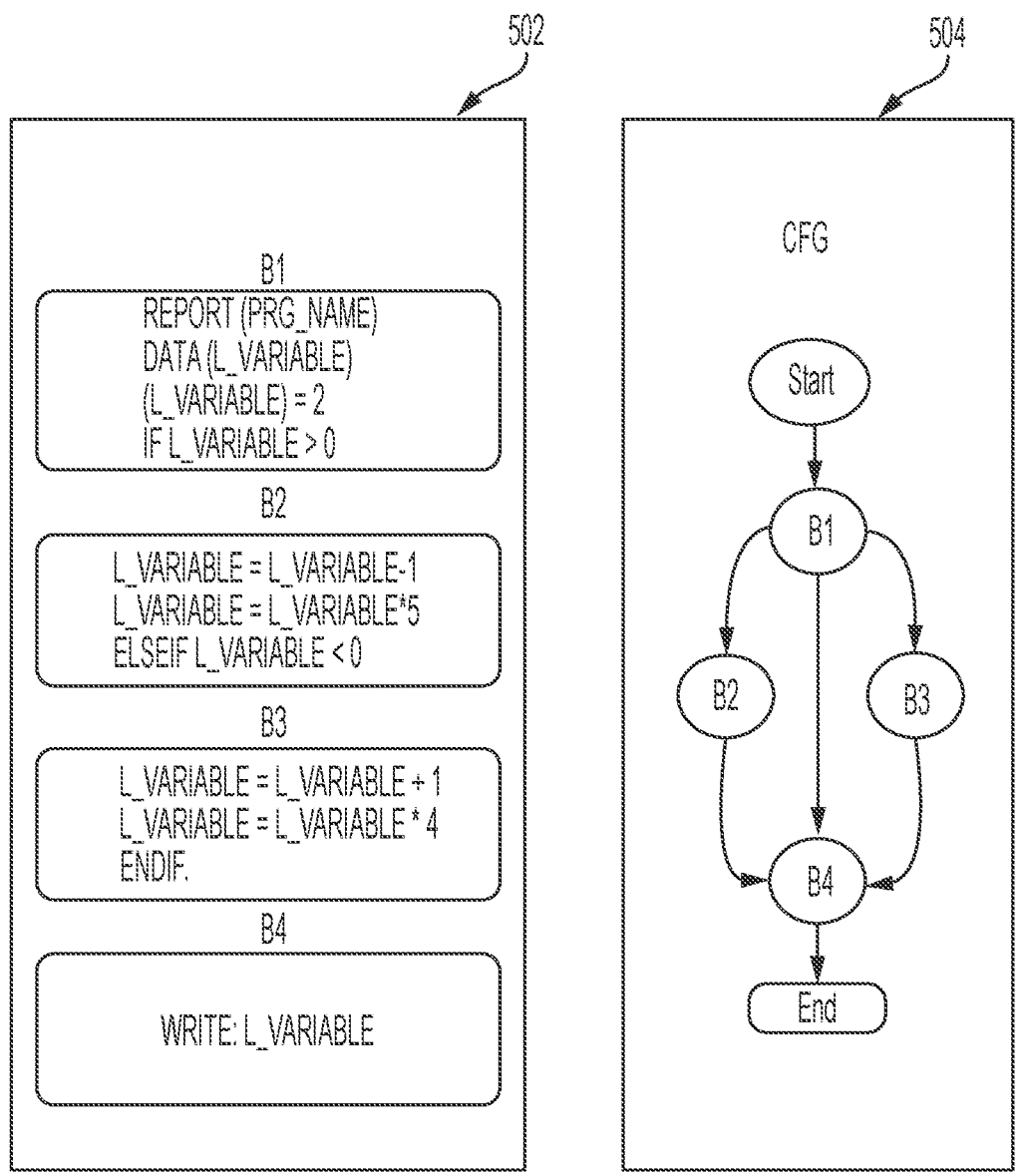
FIG. 5 illustrates an example collection of blocks that were generated from the abstract syntax tree shown in FIG. 4A.
Figure 5A:
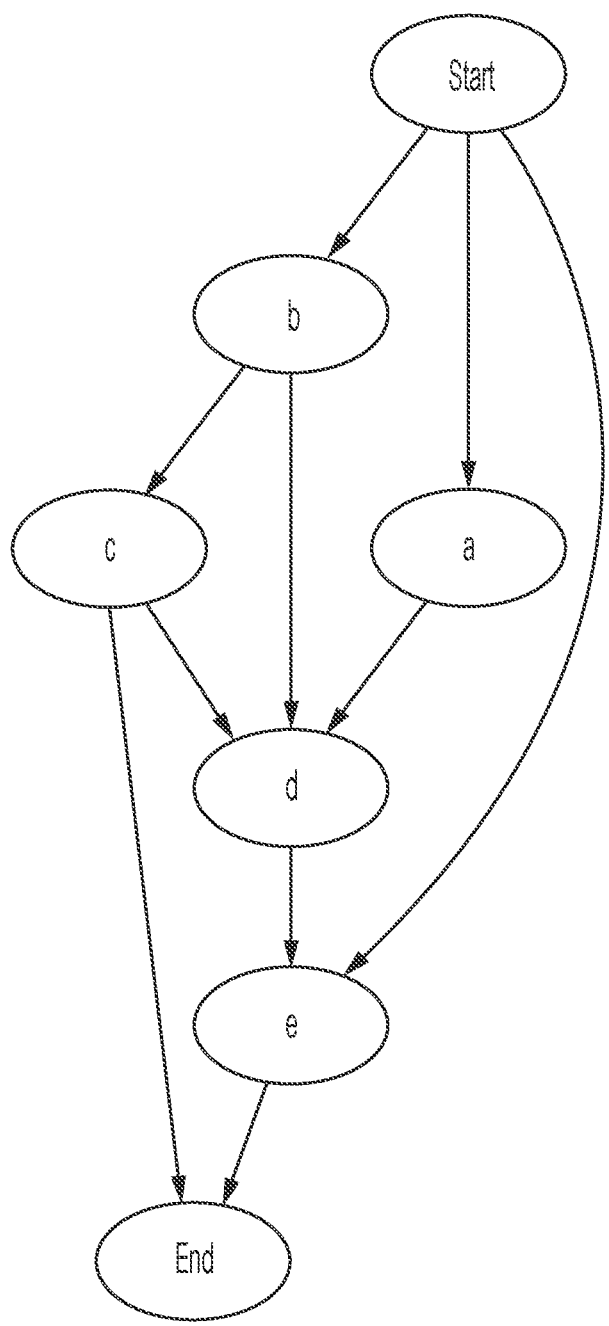
FIGS. 5A and 5B illustrate two similar, but not identical, control flow graphs that are identifiable as representing duplicative source code fragments in accordance with one or more implementations of the present application.
Figure 5B:
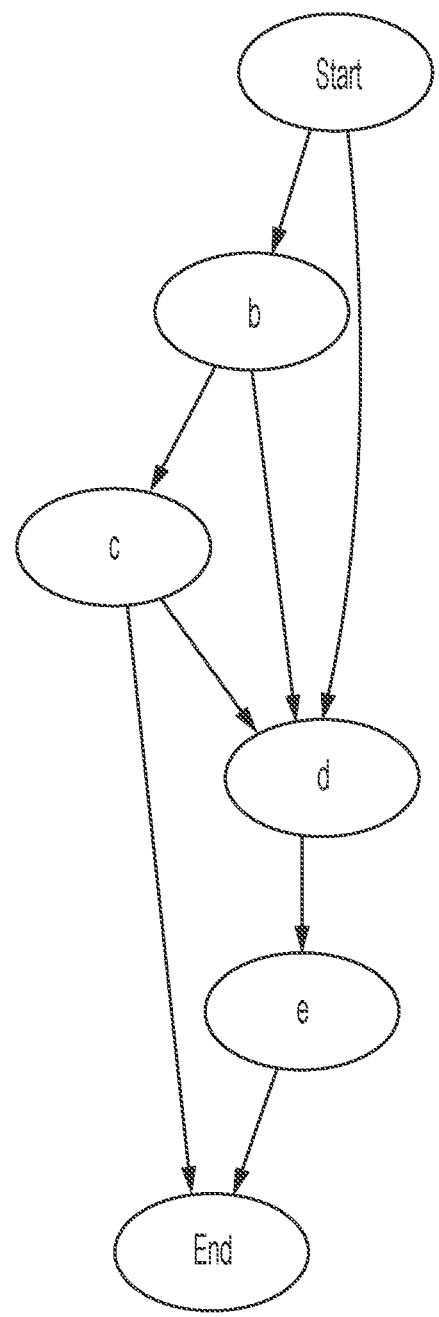

FIG. 5 illustrates an example collection of blocks 502 that were generated from the abstract syntax tree 402. Furthermore, example control flow graph 504 is illustrated in FIG. 5 that is generated from the blocks 502. Moreover, FIGS. 5A and 5B illustrate two similar, but not identical, control flow graphs that are identifiable as representing duplicative source code, in accordance with one or more implementations of the present application. As shown in the example control flow graphs shown in FIGS. 5A and 5B, differences include: block "a" of FIG. 5A is not included in the control flow graph shown in FIG. 5B, thus there is no flow from block a->block d in FIG. 5B. Also, the control flow graph of FIG. 5A does not include flow from (start)->block d, which is shown in the control flow graph of FIG. 5B. Notwithstanding these subtle differences, the control flow graphs shown in FIGS. 5A and 5B are identifiable to represent duplicative source code fragments.

Following generation of a control flow graph, execution paths in the control flow can be enumerated. For example, and as set forth in the example shown in FIG. 5, three execution paths (B1: B2: B4, B1: B4, B1: B2: B4) are supported. In one or more implementations, a simple heuristic can be used to estimate the probability of respective path execution. More particularly, the probability P(Bn) of any block Bn execution can be estimated. For example, in the example shown in FIG. 5, the value of P(B1)=1, P(B2)= 0.5.

Referring back to FIG. 2, after the control flow graph is generated, then at step 212 a digital fingerprint is generated. In one or more implementations, a fixed size fingerprint for each block B is generated based on a fixed size similarity hashing. For example, a fixed size fingerprint is generated by: Hash statement i 0→I with collision resistance h(Si). With reference to the example control flow graph 504 shown in FIG. 5, a digital fingerprint is generated for Bn as follows: f1(Bn): =(h(S0). h(S1) . . . h(SI)).

Table 2, below, illustrates an example of digital fingerprints of blocks in accordance with respective control flow graphs for two programs (P, P'). In the example shown in Table 2, program P and P' include duplicate source code.

TABLE 2

| P | P' |
|---|---|
| Report YH_SEP_15. | Report YH_SEP_15. |
| Parameter Title_1 | Parameter Title_1 |
| IF Title_1 = 'Tutorial' | IF Title_1 = 'Tutorial' |

TABLE 2-continued

| P | P' |
|---|---|
| write 'This is IF Statement' | write 'This is IF Statement' |
| ELSE | ELSE |
| write 'This is ELSE Statement' | write 'This is ELSE Statement' |
| | ENDIF. |
| | write 'Done' |
| f(b0) | f(b0) |
| da02f7448f4ed7573f53a500aca7b793 | da02f7448f4ed7573f53a500aca7b793 |
| d7fc14ceaa3096afe1f098ffeb4768f1 | d7fc14ceaa3096afe1f098ffeb4768f1 |
| f(b1) | f(b1) |
| 9b011a0f17aee0140dbe9470030a1cc8 | 9b011a0f17aee0140dbe9470030a1cc8 |
| d9f7abe8194bb121f7c1ce902d10bd57 | d4284844bdb860c705599adaf252549a |
| f(b3) | f(b2) |
| 262ba582a39e0c8f6daf8104b4870d84 | 262ba582a39e0c8f6daf8104b4870d84 |
| | d9f7abe8194bb121f7c1ce902d10bd57 |
| | f(b4) |
| | 20ed529eaa919eda946c713b60a52894 |
| f(p) | f(p') |
| da02f7448f4ed7573f53a500aca7b793 | da02f7448f4ed7573f53a500aca7b793 |
| d7fc14ceaa3096afe1f098ffeb4768f1 | d7fc14ceaa3096afe1f098ffeb4768f1 |
| 262ba582a39e0c8f6daf8104b4870d84 | 20ed529eaa919eda946c713b60a52894 |
| 9b011a0f17aee0140dbe9470030a1cc8 | 9b011a0f17aee0140dbe9470030a1cc8 |
| d9f7abe8194bb121f7c1ce902d10bd57 | d4284844bdb860c705599adaf252549a |
| | 262ba582a39e0c8f6daf8104b4870d84 |
| | d9f7abe8194bb121f7c1ce902d10bd57 |

In addition to generating a digital fingerprint for each block Bn, the present application can generate a digital fingerprint for a stored software program (P). In such cases, a digital fingerprint of a program file can be a fixed sized fingerprint that is generated by traversing the control flow graph as a weighted graph, where the probability of the branch, P(Bn), is the edge weight. Further, the blocks' traversal order is recorded in an ordered set <B0, . . . BN>, and the program fingerprint is then generated as f2(P)=<f1 (B0), . . . f(BN)>.

Providing a combination of both a block fingerprint and a program fingerprint, including in combination with fingerprint grouping (described in greater detail below), improves efficiency and accuracy over known duplicate source code identification tools. Such efficiency is particularly advantageous in large ERP systems having large codebases that would otherwise be highly resource-intensive, including with regard to processing and storage. In particular, the present application provides for searching fingerprints to identify similar code in a source code repository and to identify source code fragments that are identical or near identical in linear time. In one or more implementations, a fixed size similarity hash such as Jaccard distance or other distance metric can be generated from the software program. Jaccard distance is useful to compare dissimilarity of respective samples, including as a function of a measure of overlap between a fingerprint representing a respective block and one or more stored fingerprints. If the dissimilarity is within a predefine tolerance, then the fingerprints can be considered matched and source code within a respective block to be a duplicate of the source code.

For example and as noted above, a similarity metric such as Sim(P, P')=$B_{id}/(B_{id}+B_{df}+1/\alpha B_{ma})$ can be defined, where B_id represents one or more identical source code blocks in both program fingerprints and in the same location. Other similarity metrics are supported by the teachings herein, such as Taniomoto similarity and distance, and Tversky index.

Thus, in accordance with one or more implementations, two distinct hash tables can be generated: one for fixed program size fingerprints, and one for the blocks. For example, while searching for a program source code duplicate and where a similarity threshold is met, the programming blocks are compared using the blocks in the hash table associated with the blocks (i.e., blocks hash table). Use of two respective hash tables is particularly useful for identifying the program and also the specific fragments of code that are being or have been copied.

The fingerprinting techniques disclosed herein improve speed and efficiency of searches for similar code in large-scale program code repositories. In particular, comparisons, which yield smaller distances between different fingerprints, identify a relatively high probability of source code fragments having "close" hash codes, which can be recognized as being identical or similar (i.e., duplicative).

Figure 6A:
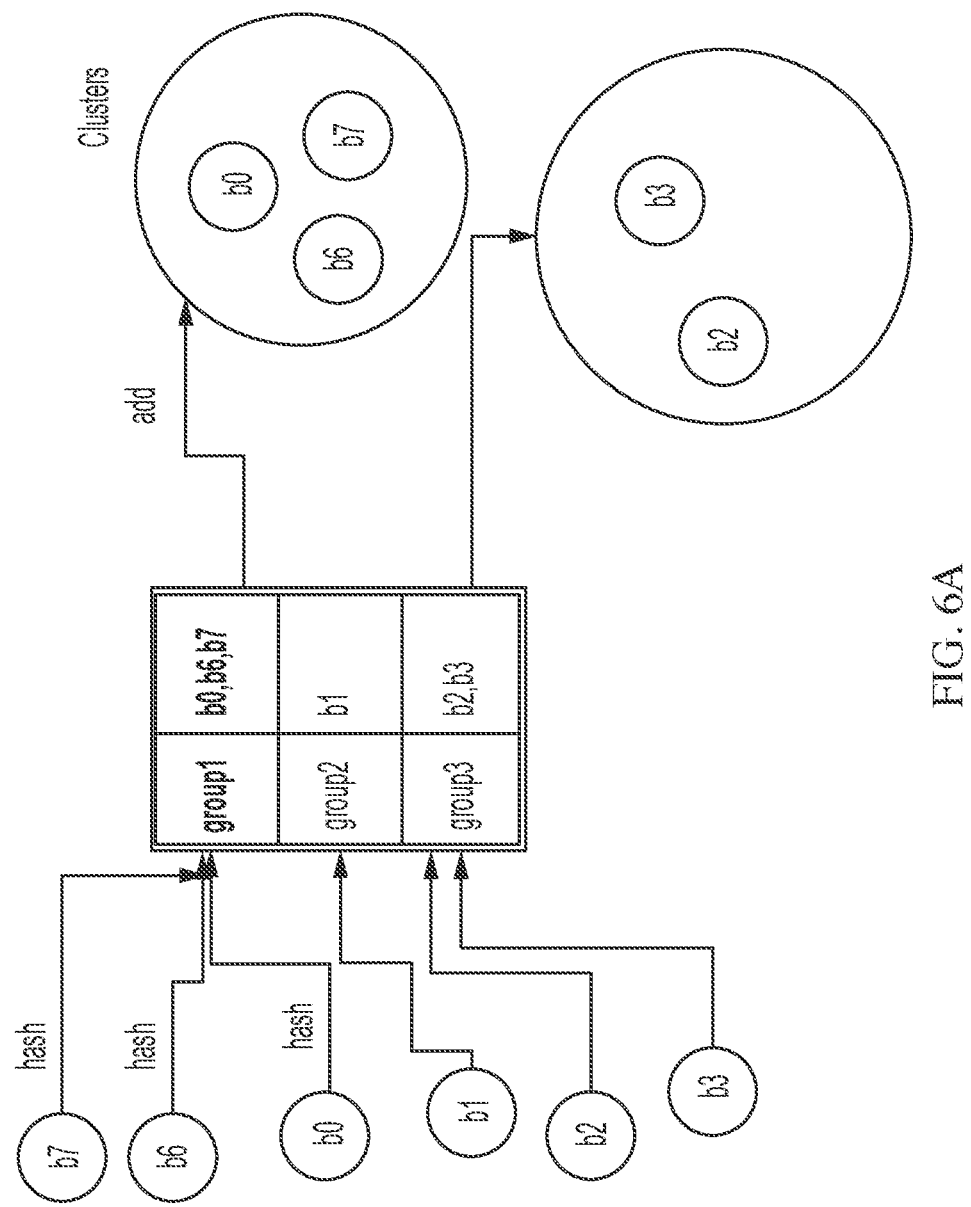
FIGS. 6A and 6B illustrate an example implementation of the present application in connection with improved searching techniques by grouping fingerprints.

In one or more implementations, fingerprints that are generated in accordance with the present application are divided into a fixed number of blocks. Fingerprints within a specific number (k) of blocks are grouped together. For example and with reference to FIG. 6A, k=3 and fingerprints that have the same first 3 hash blocks are grouped together. In this way, relevant fingerprints are grouped in similar groups or clusters. In the example shown in FIG. 6A, six fingerprints are shown (b0, b1, b2, b3, b6, b7) of which b7, b6, and b0 are hashed and grouped together in group1, on the basis of the first 3 hash blocks of those fingerprints. Fingerprint b1 is hashed and grouped in group2, while fingerprints b2 and b3 are hashed and grouped in group3, on the basis of the first 3 hash blocks of those fingerprints. When a new fingerprint is generated, the first hash blocks of the new fingerprint are determined and be used for searching for relevant clusters or groups. The size of the groups is smaller than a full database of fingerprints, which results in considerable speed improvement and reduction in search time. Hashing blocks into buckets results in similar fingerprints being grouped and searched for in the same bucket.

Figure 6B:
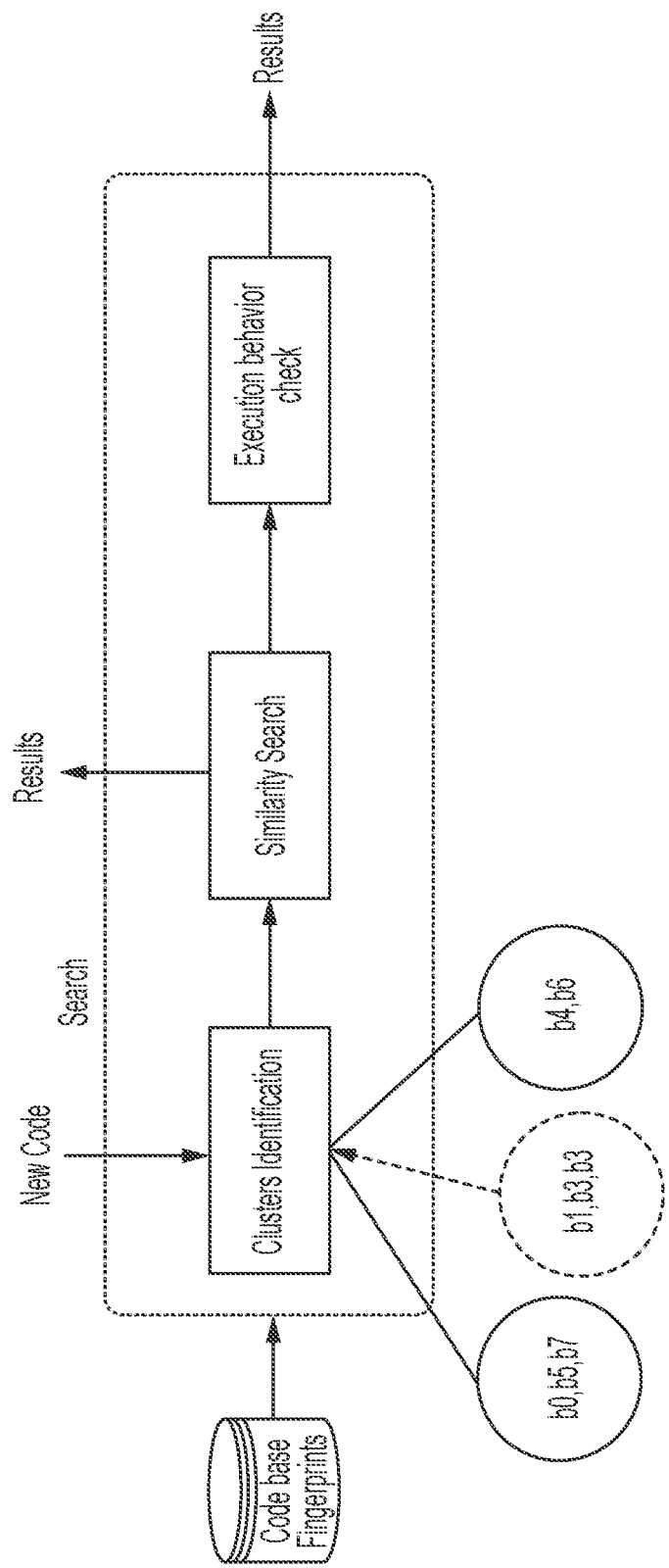

Details in connection with searching for duplicative source code as a function of hashing and grouping fingerprints is now described with further reference to FIG. 6B. At the outset, a hash lookup is performed by determining whether other blocks in a respective group or cluster are matched with those of a given fingerprint. In other words, a fingerprint "dictionary" is referenced to identify similar fingerprints within one or more groups. If the lookup fails, meaning that no blocks in a group or cluster are identified to be within a predefined threshold of similarity with blocks in a respective fingerprint, then a determination is made that there is no duplicative source code. Alternatively, if the lookup succeeds, source code which is associated with the located fingerprint(s) is identified. Thereafter, the source code associated with the respective (target) fingerprint is compared more precisely, such as via a pairwise comparison, with the source code associated with the group(s) of fingerprints to determine whether a predetermined threshold of similarity is met. If the threshold is met, then the source code is determined to be duplicative.

In this way, searching for respective fingerprints is restricted to a subset of a code base rather on an entire code base, which reduces the time and resources required for the search. In operation a search for fingerprints within one or more groups or clusters may initially generate a set of search results having a relatively high false positive rate. However, the results are refined, thereafter, such as via a pairwise search of the associated source code file in the subset of the code, based on the retrieved fingerprints. It is to be appreciated that the present application is not limited to the example source code transformation and representation techniques shown and described herein, and that alternative techniques are available that may be better suited in a particular implementation.

In another example, bloom filters, which may be more efficient, can be leveraged to find similar fragments by using the original program P={b0b1b2b3} representation to: 1) take a sliding window of n=2 blocks to P={b0b1,b1b2, b2b3} P'={b0b3,b3b4,b4b2}; 2) hash the n blocks into a bloom filter; and 3) store the bloom filter. Thereafter, search against specific program P'={b0,b3,b4,b2} can occur by: 1) taking a sliding window of n=2 blocks for P'={b0b3,b3b4, b4b2}; 2) hashing the n blocks; and 3) performing bloom a filter membership test on each of the hashed n-blocks. Similar source code is uncovered if different blocks (P,P')/P blocks>threshold value. Thereafter, 4) exact matching is performed on the returned code to filter out false positives, as described above.

Furthermore, it is recognized that various evasion techniques manipulate source code in very minor ways that may not affect the functionality of the program, but would otherwise result in a conclusion that the code is dissimilar using traditional searching traditional approaches. In response, the present application leverages the control flow graph with estimated probabilities of execution to precisely assess the semantic similarity of source code, as well as the syntax similarity.

For example, and as a represented in FIG. 6B, a cfg fuzzy hash can use basic blocks, edge and statements, and assign a different prime value to each different feature. Thereafter, a hash is generated by just prime value multiplication and modulo all the values. In one or more implementations of the present application, the following algorithm can be executed that includes the following features:

1. For each block in the program, multiply a prime value assigned to each different type of block (entry/exit points and "normal" nodes) (e.g., b0*b1* . . . *bn).
2. For each edge in each program, multiply a prime value assigned to each different type of edge with an edge probability derived from an execution probability estimation modulo the number of edges (i.e., e0pe0*e1pe1* . . . *pekek).
3. For each statement hash, multiply a prime value assigned to each statement that is considered modulo the number of statements.
4. Multiply the values assigned of the above steps to generate the hash.

Following execution of the above four steps, the final generated 'hash' is a large number result of the multiplication. This hash is usable to perform another search based on the control flow graph. The results from this search can finally be combined with text search to estimate with high confidence the syntax and semantic similarity of particular source code.

Of course, one of ordinary skill will recognize that the above algorithm is but one example of performing efficient control flow graph matching, and that other suitable approaches of graph isomorphism can be leveraged, in accordance with respective implementations. For example, one can perform a more precise (and slower) match using a weighted directed graph isomorphism where the weights are the execution probabilities for the node.

One of ordinary skill in the art will recognize that various hashing and fingerprinting techniques are supported by the present application and can be used to generate digital fingerprints that represent source code uniquely. In one or more implementations it is preferred that collision resistance is provided, particularly when generating digital fingerprints for source code programs. Moreover, the present application reduces or eliminates an avalanche effect, as known in the art, such that changes to few hashes in program statements result in a proportional change in the block fingerprint. A respective digital fingerprint that represents a program file preferably is generated using a similarity measure to account for misalignments, as well as for content differences. It is recognized by the inventors that use of a fixed fingerprint allows for faster, more space efficient searching of the code.

Figure 7:
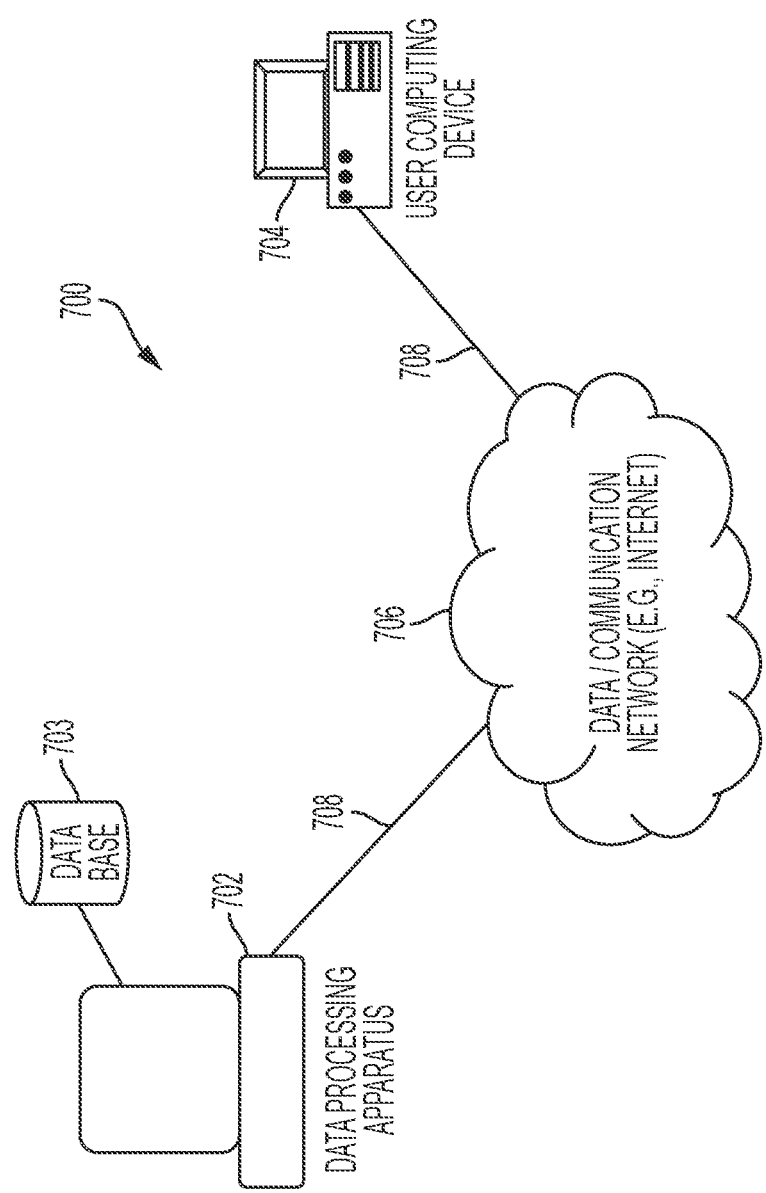
FIG. 7 is a block diagram that shows an example hardware arrangement that operates for providing the systems and methods disclosed herein.

Referring to FIG. 7, a diagram is provided that shows an example hardware arrangement that operates for providing the systems and methods disclosed herein, and designated generally as system 700. System 700 can include one or more information processors 702 that are at least communicatively coupled to one or more user computing devices 704 across communication network 706. Information processors 702 and user computing devices 704 can include, for example, mobile computing devices such as tablet computing devices, smartphones, personal digital assistants or the like, as well as laptop computers and/or desktop computers, server computers and mainframe computers. Further, one computing device may be configured as an information processor 702 and a user computing device 704, depending upon operations being executed at a particular time.

With continued reference to FIG. 7, information processor 702 can be configured to access one or more databases 703 for the present application, including source code repositories and other information. However, it is contemplated that information processor 702 can access any required databases via communication network 706 or any other communication network to which information processor 702 has access. Information processor 702 can communicate with devices comprising databases using any known communication method, including a direct serial, parallel, universal serial bus ("USB") interface, or via a local or wide area network.

User computing devices 704 can communicate with information processors 702 using data connections 708, which are respectively coupled to communication network 706. Communication network 706 can be any communication network, but typically is or includes the Internet or other computer network. Data connections 708 can be any known arrangement for accessing communication network 706, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 704 preferably have the ability to send and receive data across communication network 706, and are equipped with web browsers, software applications, or other means, to provide received data on display devices incorporated therewith. By way of example, user computing device 704 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 706, and that wireless communication can be provided between wireless devices and information processors 702.

System 700 preferably includes software that provides functionality described in greater detail herein, and preferably resides on one or more information processors 702 and/or user computing devices 704. One of the functions performed by information processor 702 is that of operating as a web server and/or a web site host. Information processors 702 typically communicate with communication network 706 across a permanent i.e., un-switched data connection 708. Permanent connectivity ensures that access to information processors 702 is always available.

Figure 8:
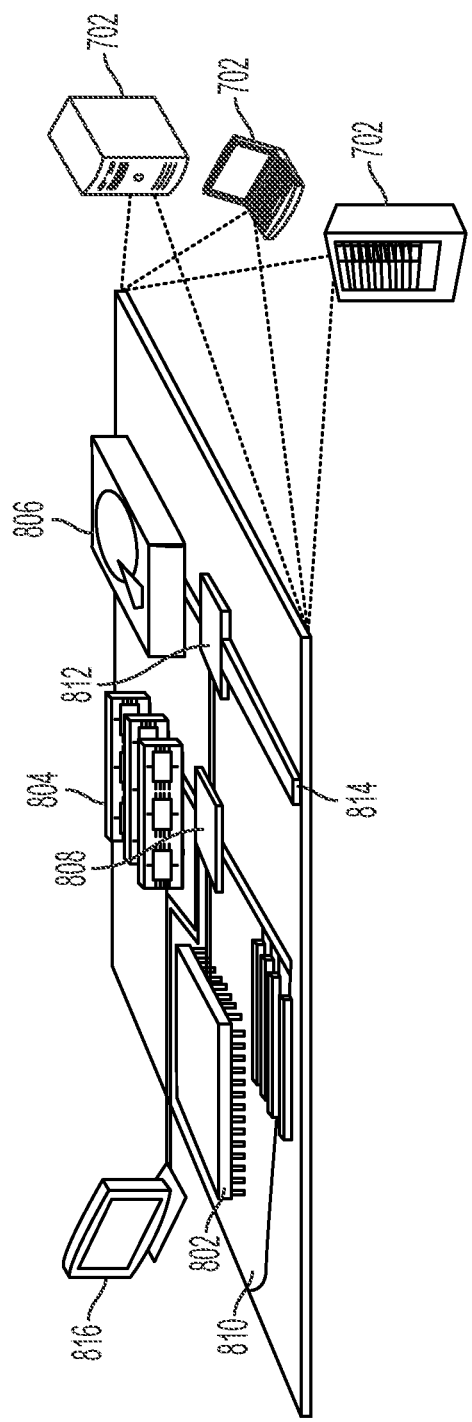
FIG. 8 shows an example of an information processor that can be used to implement the techniques described herein the present application.

FIG. 8 shows an example information processor 702 that can be used to implement the techniques described herein. The information processor 702 is intended to represent various forms of digital computers, such as laptops, desktops, workstations, personal digital assistants, servers, blade servers, mainframes, and other appropriate computers. The components shown in FIG. 8, including connections and relationships, and their functions, are meant to be exemplary only, and are not meant to limit implementations of the inventions described and/or claimed in this document.

The information processor 702 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the information processor 702, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the information processor 702. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the information processor 702. In some implementations, the storage device 806 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 can be configured to manage bandwidth-intensive operations, while the low-speed interface 812 can be configured to manage lower bandwidth-intensive operations. Of course, one of ordinary skill in the art will recognize that such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In an implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, the information processor 702 can be implemented in a number of different forms, as shown in the figure. For example, it can be implemented as a standard server, or multiple times in a group of such servers. In addition, it can be implemented in a personal computer such as a laptop computer. It can also be implemented as part of a rack server system. Alternatively, components from the computing device 200 can be combined with other components in a mobile device (not shown), such as a mobile computing device.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The technical methods here capture the execution behavior of the program not just the textual or syntax elements of a programming language. This can be done by modeling the program as blocks and capturing the execution behaviors in the fingerprints. The techniques presented herein improve upon the ability to find and identify duplicate code and to replace code with better code. Moreover, the solutions shown and described herein address problems with searching and identify areas duplicate code in at least two principal ways. First, a unique representation of the source code and control flows in the code are provided using a combination of fingerprints and hashes to enable improved speed and efficiency. Second, the teachings herein capture the program execution behavior by accounting for the probabilities of control blocks branching.

Moreover, the teachings herein improve upon known systems in various ways. For example, control flow blocks are used as a basis for the comparison, which can be a small context sensitive part of any program. Furthermore, use of control flow as a basis of searching for duplicate code allows for capturing relative behavior of the program as opposed to merely syntax information. Still further, use of multilevel fingerprints (e.g., representing blocks and programs) allow for a very efficient storage and search for duplicates.

Moreover, the present application is highly targeted to quality assurance in larger code bases and homogenous environments, such as in ERP systems. In such cases, a centralized source code representation is generated, and initial processing of the code base can be used immediately for a specific targeted search.

The systems and methods presented here present an advantage that identify different thresholds using fingerprints for different stakeholders, without compromising the precision.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed:

1. A method for identifying similarity in source code in accordance with searching digital fingerprints representing at least blocks of programming statements, the method comprising:

accessing, by at least one processor configured by executing program instructions stored on non-transitory processor-readable media, source code;

converting, by at least one processor, at least some of the source code into a plurality of tokens, each token being associated with a plurality of blocks of programming statements;

modifying, by at least one processor, the tokens by normalizing at least one value in at least one of the plurality of blocks of programming statements and by defining at least one abstraction of syntactic structure associated with at least one operation associated with at least one of the blocks of programming statements;

creating, by at least one processor, a representation associated with control flow of the plurality of blocks of programming statements associated with the modified tokens, wherein the control flow includes a plurality of possible operational paths that can be traversed during execution of the source code and associated with the plurality of blocks of programming statements associated with each of the modified tokens;

for each of the possible operational paths that can be traversed during execution:

estimating, by at least one processor, a respective probability of execution as a function of at least one heuristic; and generating, by at least one processor, as a function of at least the estimated respective probability, a digital fingerprint, wherein the digital fingerprint represents code semantics and code behavior; and determining, by at least one processor, source code within at least one block of a given token which is identifiable as being a duplicate of source code stored in a repository by comparing the generated digital fingerprint and at least one previously generated digital fingerprint.

2. The method of claim 1, further comprising:

generating, by at least one processor, an abstract syntax tree from the tokens, wherein the abstract syntax tree comprises a plurality of nodes corresponding to the source code.

3. The method of claim 2, wherein the abstract syntax tree is derived by:

defining a root element;

assigning statements to each of at least one child node of the root element; and assigning a value and/or a variable to each of the at least one child node.

4. The method of claim 1, wherein the generated representation associated with the control flow is a control flow graph.

5. The method of claim 4, further comprising:

generating, by at least one processor, an abstract syntax tree from the tokens; and generating the control flow graph using the abstract syntax tree.

6. The method of claim 1, further comprising:

generating, by at least one processor, a digital fingerprint representing a source code program associated with at least one of the tokens.

7. The method of claim 6, further comprising:

identifying, by at least one processor as a function of searching and detecting a match between the generated digital fingerprint representing the source code program and at least one previously generated digital fingerprint representing a different source code program, a duplicate of at least part of the source code program associated with at least one of the respective tokens and the different source code program.

8. The method of claim 6, further comprising:

determining, by at least one processor, that the generated digital fingerprint representing the source code program and at least one previously generated digital fingerprint representing a different source code program meet a predetermined threshold of similarity;

identifying, by at least one processor, at least one statement in the source code program that is a duplicate; and identifying, by at least one processor, at least one source code program that contains the at least one statement that is a duplicate.

9. The method of claim 1, wherein the digital fingerprint is generated as a function of hashing.

10. The method of claim 1, wherein the comparing locates a match between the generated digital fingerprint and the at least one previously generated digital fingerprint.

11. The method of claim 10, wherein the match is within a prescribed tolerance.

12. The method of claim 1, wherein the digital fingerprint represents a fixed sized source code program, and further comprising:

generating, by at least one processor, a digital fingerprint representing at least one source code fragment.

13. The method of claim 1, further comprising:

generating, by at least one processor, a plurality of digital fingerprints; and grouping, by at least one processor, at least some of the plurality of digital fingerprints based at least on a number of blocks, wherein determining the source code within at least one block of a given token which is identifiable as being a duplicate of source code stored in a repository occurs for just source code associated with the at least some of the plurality of digital fingerprints.

14. A system for identifying similarity in source code in accordance with searching digital fingerprints representing at least blocks of programming statements, the system comprising:
non-transitory processor readable media;
at least one processor operatively coupled to the at least one processor readable media;
the non-transitory processor readable media having instructions for causing the following steps to be performed by the at least one processor:
accessing source code;
converting at least some of the source code into a plurality of tokens, each token being associated with a plurality of blocks of programming statements;
modifying, by at least one processor, the tokens by normalizing at least one value in at least one of the plurality of blocks of programming statements and by defining at least one abstraction of syntactic structure associated with at least one operation associated with at least one of the blocks of programming statements;
creating a representation associated with control flow of the plurality of blocks of programming statements associated with the modified tokens, wherein the control flow includes a plurality of possible operational paths that can be traversed during execution of the source code and associated with the plurality of blocks of programming statements in each of the modified tokens;
for each of the possible operational paths that can be traversed during execution:
estimating a respective probability of execution as a function of at least one heuristic; and
generating, as a function of at least the estimated respective probability, a digital fingerprint, wherein the digital fingerprint represents code semantics and code behavior; and
determining source code within at least one block of a given token which is identifiable as being a duplicate of source code stored in a repository by comparing the generated digital fingerprint and at least one previously generated digital fingerprint.

15. The system of claim 14, wherein the non-transitory processor readable media further have instructions for causing the following steps to be performed by the at least one processor:
generating an abstract syntax tree from the tokens, wherein the abstract syntax tree comprises a plurality of nodes corresponding to the source code.

16. The system of claim 15, wherein the abstract syntax tree is derived by:
defining a root element;
assigning statements to each of at least one child node of the root element; and
assigning a value and/or a variable to each of the at least one child node.

17. The system of claim 14, wherein the generated representation associated with the control flow is a control flow graph, and further wherein the non-transitory processor readable media further have instructions for causing the following steps to be performed by the at least one processor:
generating an abstract syntax tree from the tokens; and
generating the control flow graph using the abstract syntax tree.

18. The system of claim 14, wherein the generated digital fingerprint further represents control flow associated with a plurality of the blocks.

19. The system of claim 14, wherein the non-transitory processor readable media further have instructions for causing the following steps to be performed by the at least one processor:
generating, by at least one processor, a digital fingerprint representing a source code program associated with at least one of the tokens.

20. The system of claim 19, wherein the non-transitory processor readable media further have instructions for causing the following steps to be performed by the at least one processor:
identifying, as a function of searching and detecting a match between the generated digital fingerprint representing the source code program and at least one previously generated digital fingerprint representing a different source code program, a duplicate of at least part of the source code program associated with at least one of the respective tokens and the different source code program.

21. The system of claim 19, wherein the non-transitory processor readable media further have instructions for causing the following steps to be performed by the at least one processor:
determining that the generated digital fingerprint representing the source code program and at least one previously generated digital fingerprint representing a different source code program meet a predetermined threshold of similarity;
identifying at least one statement in the source code program that is a duplicate; and
identifying at least one source code program that contains the at least one statement that is a duplicate.

22. The system of claim 14, wherein the comparing locates a match between the generated digital fingerprint and the at least one previously generated digital fingerprint.

23. The system of claim 22, wherein the match is within a prescribed tolerance.

24. A method for identifying similarity in source code in accordance with searching digital fingerprints representing at least blocks of programming statements, the method comprising:
accessing, by at least one processor configured by executing program instructions stored on non-transitory processor-readable media, source code;
transforming, by at least one processor, the source code into a data representation of a control flow that can be traversed during execution of the source code;
for each of possible operational paths that can be traversed during execution:
estimating, by at least one processor, a respective probability of execution as a function of at least one heuristic; and
generating, by at least one processor as a function of at least the estimated respective probability, a digital fingerprint associated with the represented control flow;
comparing, by at least one processor, at least one of the generated digital fingerprint with at least one other stored fingerprint to detect a match; and identifying, by at least one processor, source rode associated with one of the at least one other fingerprint as a function of the match.

\* \* \* \* \*